(12) United States Patent  (10) Patent No.: US 7,783,318 B2
Wilson et al.  (45) Date of Patent: Aug. 24, 2010

(54) CELLULAR NETWORK AMPLIFIER WITH AUTOMATED OUTPUT POWER CONTROL

(75) Inventors: James W. Wilson, St. George, UT (US); V. Alan Van Buren, Cedar City, UT (US); Volodymyr Skrypnyk, Hurricane, UT (US); Patrick L. Cook, St. George, UT (US)

(73) Assignee: Wilson Electronics, St. George, UT (US)

( * ) Notice: Subject to any disclaimer, the term of this patent is extended or adjusted under 35 U.S.C. 154(b) by 464 days.

(21) Appl. No.: 11/777,770

(22) Filed: Jul. 13, 2007

(65) Prior Publication Data

US 2008/0076437 A1 Mar. 27, 2008

Related U.S. Application Data

(63) Continuation-in-part of application No. 11/535,376, filed on Sep. 26, 2006.

(51) Int. Cl.
H04B 7/00 (2006.01)
(52) U.S. Cl. .................................. 455/522; 455/69
(58) Field of Classification Search .................. 455/522
See application file for complete search history.

(56) References Cited

U.S. PATENT DOCUMENTS

| | | | | |
|---|---|---|---|---|
| 4,539,655 | A | * | 9/1985 | Trussell et al. ............... 710/100 |
| 4,823,280 | A | * | 4/1989 | Mailandt et al. ............. 340/552 |
| 4,945,548 | A | * | 7/1990 | Iannarone et al. ............ 375/214 |
| 5,023,930 | A | * | 6/1991 | Leslie ............................. 455/9 |
| 5,095,528 | A | | 3/1992 | Leslie et al. |
| 5,392,449 | A | * | 2/1995 | Shaughnessy et al. ........... 455/8 |
| 5,400,246 | A | * | 3/1995 | Wilson et al. .................. 700/17 |
| 5,627,834 | A | * | 5/1997 | Han et al. ..................... 370/241 |
| 5,634,191 | A | * | 5/1997 | Beasley ....................... 370/279 |

(Continued)

FOREIGN PATENT DOCUMENTS

CA 2531143 A1 6/2005

(Continued)

OTHER PUBLICATIONS

Canadian Office Action dated Oct. 6, 2009 as issued in Canadian application No. 2566644.

(Continued)

Primary Examiner—Duc Nguyen
Assistant Examiner—Hai V Nguyen
(74) Attorney, Agent, or Firm—Workman Nydegger

(57) ABSTRACT

A system and method for amplifying cellular signals while maintaining the output power of the amplifier below a prescribed power limit. The network amplifier system may include a variable gain module having an input configured to receive an uplink signal from a handset and configured to apply an amplification factor to the uplink signal to generate an adjusted uplink signal. A detector is used for detecting a level of the uplink signal. A gain control module is configured to control the amplification factor in order to limit the output of the variable gain module to ensure that the level of the adjusted uplink signal does not exceed a predetermined limit. An antenna is coupled to the output of the variable gain module and is configured to transmit the adjusted uplink signal to a base station.

9 Claims, 8 Drawing Sheets

U.S. PATENT DOCUMENTS

| | | | | |
|---|---|---|---|---|
| 5,729,540 | A * | 3/1998 | Wegrzyn | 370/336 |
| 5,767,778 | A * | 6/1998 | Stone et al. | 340/636.1 |
| 5,813,765 | A * | 9/1998 | Peel et al. | 374/141 |
| 5,832,365 | A * | 11/1998 | Chen et al. | 455/15 |
| 5,850,593 | A * | 12/1998 | Uratani | 455/11.1 |
| 5,873,040 | A * | 2/1999 | Dunn et al. | 455/456.2 |
| 5,890,054 | A * | 3/1999 | Logsdon et al. | 455/11.1 |
| 5,901,341 | A * | 5/1999 | Moon et al. | 455/9 |
| 5,905,492 | A * | 5/1999 | Straub et al. | 715/744 |
| 5,918,154 | A * | 6/1999 | Beasley | 455/11.1 |
| 5,937,332 | A * | 8/1999 | Karabinis | 455/12.1 |
| 6,041,124 | A * | 3/2000 | Sugita | 380/270 |
| 6,046,674 | A * | 4/2000 | Irwin et al. | 340/539.28 |
| 6,125,275 | A * | 9/2000 | Comer et al. | 455/426.1 |
| 6,141,531 | A * | 10/2000 | Williams et al. | 455/7 |
| 6,219,540 | B1 * | 4/2001 | Besharat et al. | 455/421 |
| 6,246,320 | B1 * | 6/2001 | Monroe | 340/506 |
| 6,275,710 | B1 * | 8/2001 | Oinonen et al. | 455/466 |
| 6,278,703 | B1 * | 8/2001 | Neufeld | 370/342 |
| 6,297,766 | B1 * | 10/2001 | Koeller | 342/357.06 |
| 6,300,871 | B1 * | 10/2001 | Irwin et al. | 340/539.28 |
| 6,374,119 | B1 * | 4/2002 | Jun et al. | 455/523 |
| 6,490,455 | B1 * | 12/2002 | Park et al. | 455/456.4 |
| 6,505,123 | B1 * | 1/2003 | Root et al. | 702/3 |
| 6,542,752 | B1 * | 4/2003 | Illidge | 455/458 |
| 6,687,487 | B1 * | 2/2004 | Mosebrook et al. | 455/11.1 |
| 6,697,641 | B1 * | 2/2004 | Shapira | 455/562.1 |
| 6,718,160 | B2 * | 4/2004 | Schmutz | 455/11.1 |
| 6,731,904 | B1 * | 5/2004 | Judd | 455/11.1 |
| 6,745,021 | B1 * | 6/2004 | Stevens | 455/404.1 |
| 6,751,483 | B1 * | 6/2004 | Oh | 455/566 |
| 6,785,511 | B1 * | 8/2004 | Hengeveld et al. | 455/16 |
| 6,892,080 | B2 | 5/2005 | Friesen et al. | |
| 6,959,196 | B1 * | 10/2005 | Yarkosky | 455/466 |
| 6,993,287 | B2 | 1/2006 | O'Neill | |
| 7,006,461 | B2 * | 2/2006 | Kilfoyle et al. | 370/315 |
| 7,221,967 | B2 * | 5/2007 | Van Buren et al. | 455/571 |
| 7,333,467 | B2 * | 2/2008 | Kuehnle et al. | 370/345 |
| 7,406,295 | B1 * | 7/2008 | Yarkosky | 455/9 |
| 7,409,186 | B2 * | 8/2008 | Van Buren et al. | 455/10 |
| 7,486,929 | B2 * | 2/2009 | Van Buren et al. | 455/11.1 |
| 7,565,106 | B1 * | 7/2009 | Oh et al. | 455/7 |
| 7,577,398 | B2 * | 8/2009 | Judd et al. | 455/11.1 |
| 7,729,669 | B2 * | 6/2010 | Van Buren et al. | 455/127.1 |
| 2002/0017988 | A1 * | 2/2002 | Irwin | 340/539 |
| 2002/0045431 | A1 * | 4/2002 | Bongfeldt | 455/234.1 |
| 2002/0045461 | A1 | 4/2002 | Bongfeldt | |
| 2002/0068534 | A1 * | 6/2002 | Ue et al. | 455/92 |
| 2002/0073140 | A1 * | 6/2002 | Chae | 709/201 |
| 2002/0155839 | A1 * | 10/2002 | Nisbet | 455/450 |
| 2003/0092442 | A1 * | 5/2003 | Dalal et al. | 455/434 |
| 2003/0119460 | A1 * | 6/2003 | Zipper | 455/115 |
| 2003/0134654 | A1 * | 7/2003 | Masuda et al. | 455/522 |
| 2003/0214919 | A1 * | 11/2003 | Kilfoyle et al. | 370/315 |
| 2004/0097189 | A1 * | 5/2004 | Bongfeldt et al. | 455/7 |
| 2004/0157551 | A1 * | 8/2004 | Gainey et al. | 455/11.1 |
| 2005/0111683 | A1 * | 5/2005 | Chabries et al. | 381/317 |
| 2005/0118972 | A1 * | 6/2005 | Nara et al. | 455/234.1 |
| 2005/0272457 | A1 * | 12/2005 | Nichols et al. | 455/522 |
| 2005/0272458 | A1 * | 12/2005 | Sakoda | 455/522 |
| 2006/0077920 | A1 * | 4/2006 | Kilfoyle et al. | 370/315 |
| 2006/0077927 | A1 * | 4/2006 | Kilfoyle et al. | 370/328 |
| 2006/0083196 | A1 * | 4/2006 | Kilfoyle et al. | 370/328 |
| 2006/0105719 | A1 * | 5/2006 | Itoh et al. | 455/69 |
| 2006/0121856 | A1 * | 6/2006 | Itoh et al. | 455/69 |
| 2006/0205344 | A1 * | 9/2006 | Roper et al. | 455/11.1 |
| 2006/0205358 | A1 * | 9/2006 | Itoh et al. | 455/69 |
| 2006/0209997 | A1 * | 9/2006 | Van Buren et al. | 375/345 |
| 2007/0225005 | A1 * | 9/2007 | Unkefer et al. | 455/450 |
| 2007/0225006 | A1 * | 9/2007 | Unkefer et al. | 455/450 |
| 2007/0225007 | A1 * | 9/2007 | Unkefer et al. | 455/450 |
| 2007/0225008 | A1 * | 9/2007 | Unkefer et al. | 455/450 |
| 2007/0225009 | A1 * | 9/2007 | Unkefer et al. | 455/450 |
| 2007/0225010 | A1 * | 9/2007 | Unkefer et al. | 455/450 |
| 2007/0225011 | A1 * | 9/2007 | Unkefer et al. | 455/450 |
| 2008/0014862 | A1 * | 1/2008 | Van Buren et al. | 455/7 |
| 2008/0014863 | A1 * | 1/2008 | Van Buren et al. | 455/7 |
| 2008/0020705 | A1 * | 1/2008 | MacConnell | 455/15 |
| 2008/0076358 | A1 * | 3/2008 | Van Buren et al. | 455/63.1 |
| 2008/0076437 | A1 * | 3/2008 | Wilson et al. | 455/450 |
| 2008/0076988 | A1 * | 3/2008 | Sarussi et al. | 600/323 |
| 2008/0076990 | A1 * | 3/2008 | Sarussi et al. | 600/324 |
| 2008/0188229 | A1 * | 8/2008 | Melis et al. | 455/450 |

FOREIGN PATENT DOCUMENTS

CA        2607144        10/2009

OTHER PUBLICATIONS

U.S. Appl. No. 11/535,376, Mail Date Aug. 31, 2009, Office Action.

\* cited by examiner

CELLULAR NETWORK AMPLIFIER WITH AUTOMATED OUTPUT POWER CONTROL

CROSS-REFERENCE TO RELATED APPLICATIONS

This application is a Continuation-in-Part of U.S. application Ser. No. 11/535,376 entitled PROCESSOR-CONTROLLED VARIABLE GAIN CELLULAR NETWORK AMPLIFIER and filed Sep. 26, 2006, which application is incorporated herein by reference in its entirety.

BACKGROUND OF THE INVENTION

1. The Field of the Invention

The present invention relates to cellular network amplifiers. More particularly, embodiments of the present invention relate to systems and methods for dynamically controlling a network amplifier to provide an optimal gain level and to minimize amplifier oscillation.

2. The Relevant Technology

In recent years, cellular ("cell" or "mobile") telephones have dramatically increased in popularity. A growing number of people are relying exclusively on cell phones, and are abandoning their traditional land line telephone services in favor of the convenience of the mobility of cell phones. Others are simply adding cell phones while retaining land line telephone services. In any case, this increase in cell phone reliance has resulted in the need for reliable cellular signal coverage over a wider area.

Use of cell phones in areas having a weak signal often results in dropped calls which can be annoying for the cell phone user and expensive for the wireless service provider. Dropped calls typically result when the signal between the cell phone and the base station is lost. A loss of signal may occur for a number of reasons, including interference due to buildings or mountains, or an increase in distance between the cell phone and the base station, or for other reasons. Therefore, a particular need exists to increase the reliability of cell phones near large buildings and in vehicles driving long distances in remote areas as well as other reasons.

Attempts have been made to increase the reliability of cell phones through use of cell phone signal boosters, also known as cellular network amplifiers. Cellular network amplifiers receive the cellular signal sent from a base station, amplify the signal, and retransmit the signal to one or more cell phones. Similarly, the cellular network amplifier receives the signals from one or more cell phones, amplifies the signals, and retransmits the signals to the base station.

Cellular network amplifiers are typically placed in relatively close proximity to one or more cell phones, and serve the purpose of increasing the level of the signals being transmitted to and from the cell phones so that the cell phones can communicate with base stations that would otherwise be out of range. Some amplifiers are configured to be integrated with the cell phone itself or with a cell phone cradle. Alternatively, other amplifiers are configured to be placed in a separate location from the cell phone itself. For example, a cellular network amplifier may be placed in a user's vehicle, or in or near a building that might otherwise have poor reception.

Conventional cell phone signal boosters apply constant gain levels to the signal passing through the amplifier. A conventional signal booster typically increases signal power of an uplink or downlink signal using a constant gain level regardless of the level of the received signal. However, if the signal booster receives an uplink signal having a high power level from a cellular telephone and amplifies the uplink signal using the constant gain level, the resultant signal may be amplified beyond a preferred level. Consequently, the signals transmitted from the signal booster may cause interference to be introduced in the surrounding cellular network. The high output levels may also overload the amplifier, causing unwanted distortion. Furthermore, regulatory agencies place upper limits on the cellular signal power levels can be transmitted from a device. By applying a constant level of gain to all signals, a cellular signal amplifier may inadvertently violate these regulations.

The tendency for many cell phone signal boosters to produce unwanted high power levels can create significant problems for wireless service providers by overloading and thereby disrupting cellular systems. Since wireless service providers often evaluate and approve cellular network amplifiers before they are used in the providers' systems, the providers are unlikely to approve signal boosters that produce overamplified signals.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

The present invention relates to methods and amplifier systems for amplifying cellular signals while maintaining the output power levels of the amplifier below a prescribed limit. In one embodiment, a network amplifier system includes a variable gain module having an input configured to receive an uplink signal from a handset and configured to apply an amplification factor to the uplink signal to generate an adjusted uplink signal to be transmitted to a base station. A detector is used for detecting a level of the uplink signal. A gain control module is configured to control the amplification factor in order to limit the output of the variable gain module to ensure that the level of the adjusted uplink signal does not exceed a predetermined limit. An antenna is coupled to an output of the variable gain module and is configured to transmit the adjusted uplink signal to a base station.

A further embodiment is directed to a method of variably amplifying a cellular signal. The method may be practiced, for example, in a network amplifier having one or more computer readable media having stored thereon computer executable instructions that, when executed by a processor, can cause the network amplifier to perform the method. The method includes receiving an uplink signal from a handset via a first antenna and measuring a level of the uplink signal. A determination is made as to whether amplifying the uplink signal using an amplification factor will generate an adjusted uplink signal having a level that exceeds a predetermined limit. If the adjusted uplink signal level exceeds the first predetermined limit, the first amplification factor is adjusted such that the adjusted uplink signal level remains below the first predetermined limit. The uplink signal is amplified using the resultant amplification factor, and the adjusted uplink signal is transmitted to a base station via a second antenna.

In another embodiment of the invention, a network amplifier includes a first antenna configured to receive an uplink signal from a handset and a first detector for detecting a level of the uplink signal. A gain module is configured to apply a first amplification factor to the uplink signal to generate an adjusted uplink signal. The gain module may include a first amplifier configured to amplify the uplink signal and a multistage attenuator configured to attenuate the uplink signal.

The multistage attenuator may progressively activate stages of attenuation as the level of the uplink signal increases in order to maintain the adjusted uplink signal level below a predetermined level. The amplification factor includes a combined effect of the first amplifier and the first multistage attenuator. Finally, a second antenna is coupled to an output of the gain module and is configured to transmit the adjusted uplink signal to a base station.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
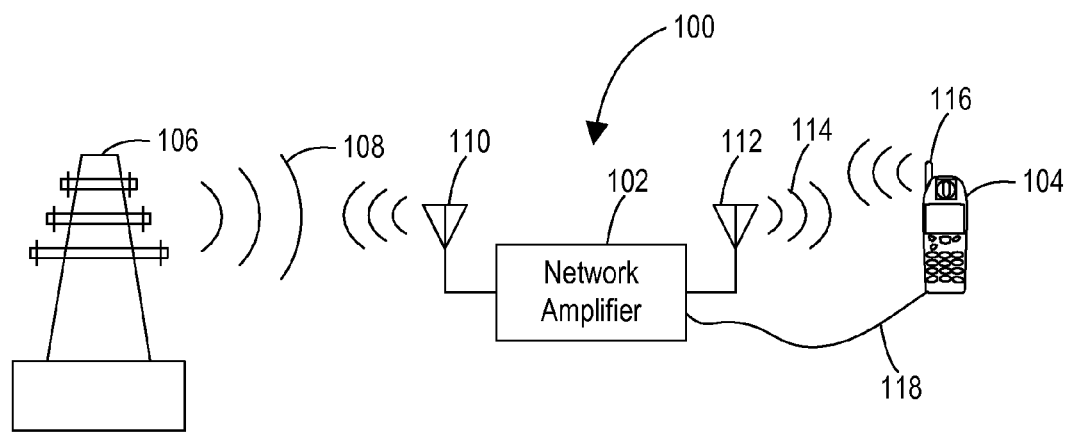
FIG. 1 illustrates a block diagram of a cellular communications system.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the invention relate to amplifiers that enhance the ability of a device such as a cellular telephone to communicate in a wireless network. The present invention extends to a cellular network amplifier that dynamically adjusts the gain applied to a cellular signal. One embodiment of the network amplifier variably adjusts its gain as needed. The ability to automatically adjust the gain applied to a cellular signal can prevent the amplifier from generating signals that may interfere with the operation of a cellular network or with the operation of the network amplifier itself. Too much gain, for example, can cause the network amplifier to oscillate, which results in interference to the cellular network and adversely impacts users of the cellular network. Also, too much gain increases the amount of residual noise at the base station.

Embodiments of the network amplifier can be integrated with cellular telephones (or other devices) or connect with a cellular telephone. The amplifier acts as an intermediary between a base station (or other cell site) and a handset (a cellular telephone or other device). Signals generated by the cellular telephone are amplified and retransmitted by the network amplifier. The network amplifier also receives signals from the base station and transmits them to the cellular telephone. In some embodiments, a network amplifier can act as an intermediary between a base station and multiple handsets.

The cellular network amplifier receives a first cellular signal from a base station via a first antenna and a second cellular signal from a handset via a second antenna. A control circuit analyzes the cellular signals to determine the presence of oscillation, and adjusts an amplification factor in a manner that eliminates the oscillating condition. The adjusted amplification factor is applied to the first and/or second cellular signals, and the resulting cellular signals are retransmitted via the first and second antennas to the base station and the handset, respectively.

For purposes of the present invention, the following definitions are provided. The terms "cellular" and "cellular network" refer to a wireless telephone network that connects radio transmissions between a mobile phone and a system of multiple cell sites, each including an antenna and a base station, to a mobile telephone switching office, and ultimately to the public wireline telephone system. Cellular calls are transferred from base station to base station as a user travels from cell to cell. One of skill in the art can appreciate that embodiments of the invention can be applied to other wireless networks including those operating on various frequencies throughout the electromagnetic spectrum.

By way of example, the phrase "cell phone" refers to a wireless device that sends and receives messages using radiofrequency signals in the 800-900 megahertz (MHz) portion of the radiofrequency (RF) spectrum, and the phrase "PCS phone" (personal communication system phone) refers to a wireless device that uses radiofrequency signals in the 1850-1990 MHz portion of the RF spectrum. For purposes of simplicity, as used herein, the terms "cell phone" and "handset" are intended to cover both "cell phone" and "PCS phone", as defined above, as well as other handheld devices. Likewise, as used herein, the phrase "cellular signal" refers to signals being transmitted both in the cell phone spectrum (i.e., 800-900 MHz) and in the PCS spectrum (i.e., 1850-1990 MHz). One of skill in the art can appreciate that embodiments of the invention are not limited to operation in these frequency spectrums, but can be applied in other portions of the frequency spectrum as well. In addition, other wireless devices such as personal digital assistants, laptop computers, and the like can benefit from embodiments of the invention.

"Cell site" and "base station" are used herein interchangeably. Cell site and base station are defined as the location where the wireless network antenna and communications equipment are placed. A cell site or base station typically includes a transmitter/receiver, antenna tower, transmission radios and radio controllers for maintaining communications with mobile handsets within a given range.

The word "uplink" refers to the transmission path of a signal being transmitted from a handset to a base station. The word "downlink" refers to the transmission path of a signal being transmitted from the base station to the handset. The phrases "uplink signal" and "downlink signal" are not limited to any particular type of data that may be transmitted between a handset and a base station, but instead are simply used to specify the direction in which a signal is being transmitted.

FIG. 1 shows an exemplary communications system 100. The communications system 100 may be a cellular telephone wireless network or other wireless network. In this example, a network amplifier 102 amplifies the signals transmitted between a base station 106 and a handset 104. In a typical system, the network amplifier 102 is located in close proximity to the handset 104 in comparison to the distance to the base station 106. The base station 106 transmits a signal 108 which is attenuated for various reasons known to one of skill in the art as it travels outward from the base station 106. An antenna 110 receives the signal 108 and converts the radiated signal into a conducted electrical equivalent.

The network amplifier 102 amplifies the electrical signal and communicates the amplified signal to the handset 104. In one example, the network amplifier 102 may retransmit the electrical signal from a second antenna 112 as an amplified RF signal 114. The amplified signal 114 is received by an antenna 116 of handset 104, which processes the signal and ultimately communicates the appropriate content to a user of handset 104. As previously indicated, the network amplifier 102 may be an integral part of the handset 104.

Similarly, the handset 104 may communicate content to the network amplifier 102 by transmitting an RF signal from the antenna 116, which is ultimately received by the antenna 112. The network amplifier 102 amplifies the received signal and retransmits the signal using the antenna 110. The transmitted signal is received by the base station 106, which may perform a number of operations on the signal, as determined by the wireless service provider.

Figure 2:
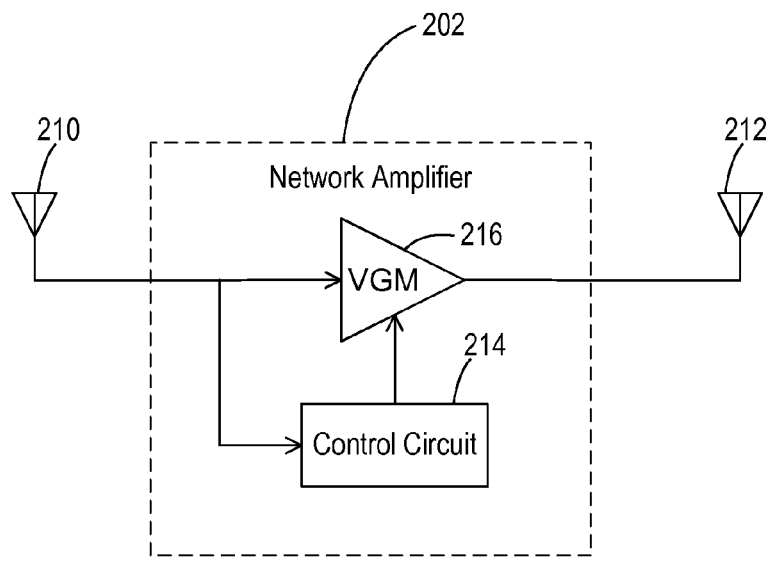
FIG. 2 illustrates one embodiment of a unidirectional amplifier.

FIG. 2 illustrates a generalized unidirectional amplifier 202 configured for producing an optimal gain level, in accordance with the present invention. The amplifier 202 is connected to an antenna 210 which is configured to receive a signal. The antenna 210 converts the received signal into an electrical signal. The electrical signal is received by a variable gain module (VGM) 216, which applies an amplification factor to the electrical signal. In one embodiment, the electronic signal is communicated via a second antenna 212, which transmits the adjusted electrical signal as an RF signal, to be received by one or more handsets or other devices.

The variable gain module 216 is controlled by a control circuit 214. The control circuit 214 receives the electrical signal from the antenna 210, and based on the properties of the electrical signal, determines an optimal amplification factor that should be applied to the electrical signal. The control circuit 214 provides a control signal to the variable gain module 216. The control signal instructs the gain module 216 at least as to the amplification factor that should be applied to the electrical signal. Many factors may be accounted for when calculating the required amplification factor. Factors include, by way of example and not limitation, the level or strength of the electrical signal and whether there is any indication that the network amplifier 202 is oscillating or overloading the cellular network in any way.

The amplification factor, in one embodiment, is a multiplier that is applied to the electrical signal. The amplification factor can result in either an amplified or attenuated output signal. In other words, where the absolute value of the amplification factor is less than one, the amplified adjusted signal will have a lower amplitude than the original electrical signal. Conversely, when the absolute value of the amplification factor is greater than one, the amplified adjusted signal will have a greater amplitude than the original electrical signal.

Figure 3A:
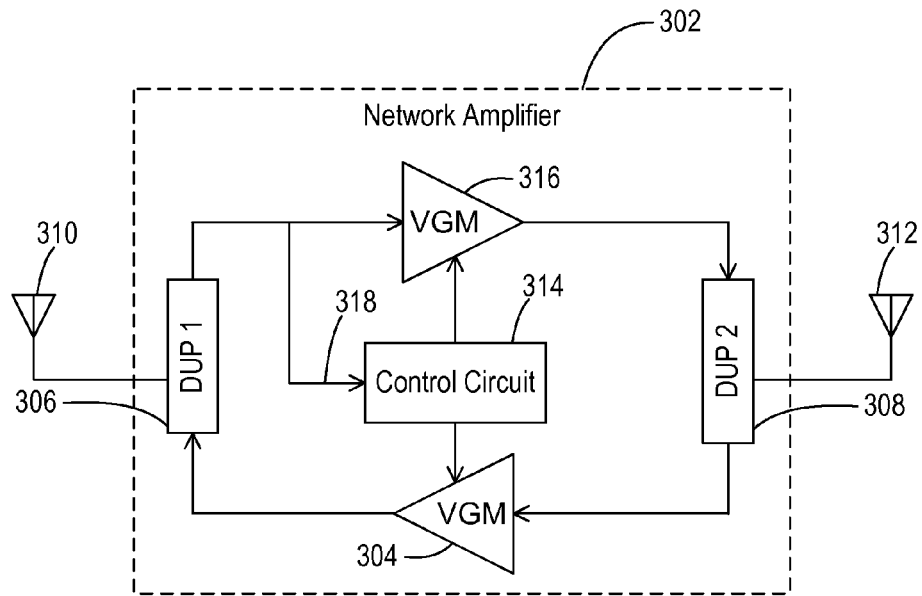
FIGS. 3A, 3B, 4A, and 4B are exemplary schematics of bidirectional cellular network amplifiers.

FIG. 3A illustrates one embodiment of a bidirectional network amplifier 302 configured to control the amplification of cellular signals being transmitted between a base station and a handset. Similar to network amplifier 202 illustrated in FIG. 2, a cellular signal is received from a base station at the antenna 310 and is passed to both a control circuit 314 and a variable gain module 316. Control circuit 314 controls the amplification factor of variable gain module 316. The amplified signal may be connected to a second antenna 312, which transmits a cellular signal to at least one handset.

Bidirectional cellular amplifier 302 is also configured to receive signals from one or more handsets, amplify those signals, and retransmit the signals to a base station. A signal from a handset may be received by antenna 312. The signal is routed to a second variable gain module 304, which applies an amplification factor to the signal. The amplification factor is determined and controlled by control circuitry 314.

In order to allow antennas 310 and 312 to simultaneously transmit and receive signals, duplexers (DUP) 306 and 308 are provided by way of example. A duplexer is defined, by way of example, as an automatic electrical routing device that permits simultaneous transmitting and receiving through a common point. More generally, a duplexer is a three port device with one common port "A" and two independent ports "B" and "C". Ideally, signals are passed from A to B and from C to A, but not between B and C. For example, the duplexer 306 receives an RF signal from a base station and converts the signal into a first electrical signal, which is routed to the inputs of the variable gain device 316 and the control circuitry 314. The duplexer 306 simultaneously receives a second electrical signal from the output of the variable gain module 304, and causes this signal to be transmitted as an RF signal via the antenna 310.

The control circuitry 314 may be configured to accomplish various objectives when determining the amplification factors to be applied to the variable gain modules 304 and 316. Exemplary objectives include, but are not limited to, i) setting the power level at which the signals are transmitted at a sufficient level to ensure that the signals reach a target destination; and ii) ensuring that the signals transmitted from the network amplifier are transmitted at a power level that substantially eliminates the interference that would otherwise be introduced into the surrounding cellular network.

First, the control circuitry 314 establishes the amplification factors of the variable gain modules 304 and 316 so that the resultant signals are transmitted with sufficient power to adequately reach a target destination, such as a handset or a base station. Where the cellular signal received at the antenna 310 has undergone significant attenuation, e.g., when the target destination is located a long distance away from the network amplifier 302, the amplification factor is increased. Conversely, where the cellular signal received at the antenna 310 is at a sufficiently high level, a lower amplification may be established for variable gain modules 316 and 304.

Second, the control circuitry 314 ensures that the signals transmitted from the network amplifier are transmitted at a power level that substantially eliminates the interference that would otherwise be introduced into the surrounding cellular network. Many cellular networks, such as CDMA systems, are configured such that the power level transmitted by each handset in the network is determined by the base station. When communication between a handset and a base station is initiated, a "handshake" occurs between the handset and base station, and the base station instructs the handset as to the power at which the handset should transmit. If the base station determines that the signal from the handset is too strong, it will instruct the handset to reduce the power level of the transmitted signal. The CDMA system is designed so that all of the signals coming into the base station are of approximately the same power. If one signal arrives at the base station at a power level that is significantly higher than the others, it can potentially overpower the base station and cause interference with the other handsets in communication with the base station. If the signal arriving at the base station does not have enough power, it will not be intelligible due to the simultaneous presence of stronger signals.

Therefore, the control circuitry 314 may determine the maximum amplitude or power level that can be transmitted by antenna 310 to substantially eliminate interference. Interference is considered to be substantially eliminated when signals are transmitted from the network amplifier 302 without causing harmful effects to the surrounding cellular network. For example, interference is substantially eliminated where the signals are transmitted without overpowering the base station, or otherwise interfering with other handsets within the cellular network in a way that degrades their performance. The control circuitry 314 may establish the amplification factors applied to variable gain modules to either attenuate or amplify the electrical signals in order to achieve this objective.

The determination of the amplification factor values may be dependent on whether the signals received from the base station via antenna 310 exceed a threshold value. The threshold value may be a predetermined set value, or may be a variable that is not established until the control circuitry 314 makes a determination. For example, if after analyzing the strength of the signals received via antenna 310, the control circuitry 314 determines that the signal attenuation between cellular network amplifier 302 and the target base station or handset is substantial, the control circuitry 314 may establish higher threshold values than if the base station signal was less attenuated. The higher threshold values would allow a greater amplification factor to be applied to the signals so that the transmitted signals will reach their target destination. Because of the substantial distance over which the signals must traverse, the signals will arrive at the target destination (e.g., a base station) without exceeding an appropriate power level, and will therefore not overpower the base station or cause substantial interference with signals transmitted from other handsets.

In the embodiment of FIG. 3A, the amplification factors applied to the variable gain modules 316 and 304 are both determined based on the attributes of the signal received from a base station via the antenna 310. The input signal from the base station is received by the control circuitry 314 from the antenna 310 at the connection 318. The control circuitry 314 can make a number of determinations based on the attributes of the base station signal. First, the control circuitry 314 can determine the amplitude level of the signal from the base station. Based on the amplitude, the control circuitry can determine an adequate amplification factor for the variable gain module 316 to enable communication of the received signal to a handset. Second, the amplitude of the signal received from the base station is also an indicator of the amplitude required to successfully transmit a signal back to the base station via the antenna 310. For example, if the control circuitry 314 measures a low amplitude of the first electrical signal, it is likely that the signal transmitted by the base station has been substantially attenuated between the base station and the network amplifier 302. Therefore, it can determine the amplification factor required by the variable gain module 304 so that the second electrical signal originating from the handset is retransmitted with sufficient power to reach the base station.

Figure 3B:
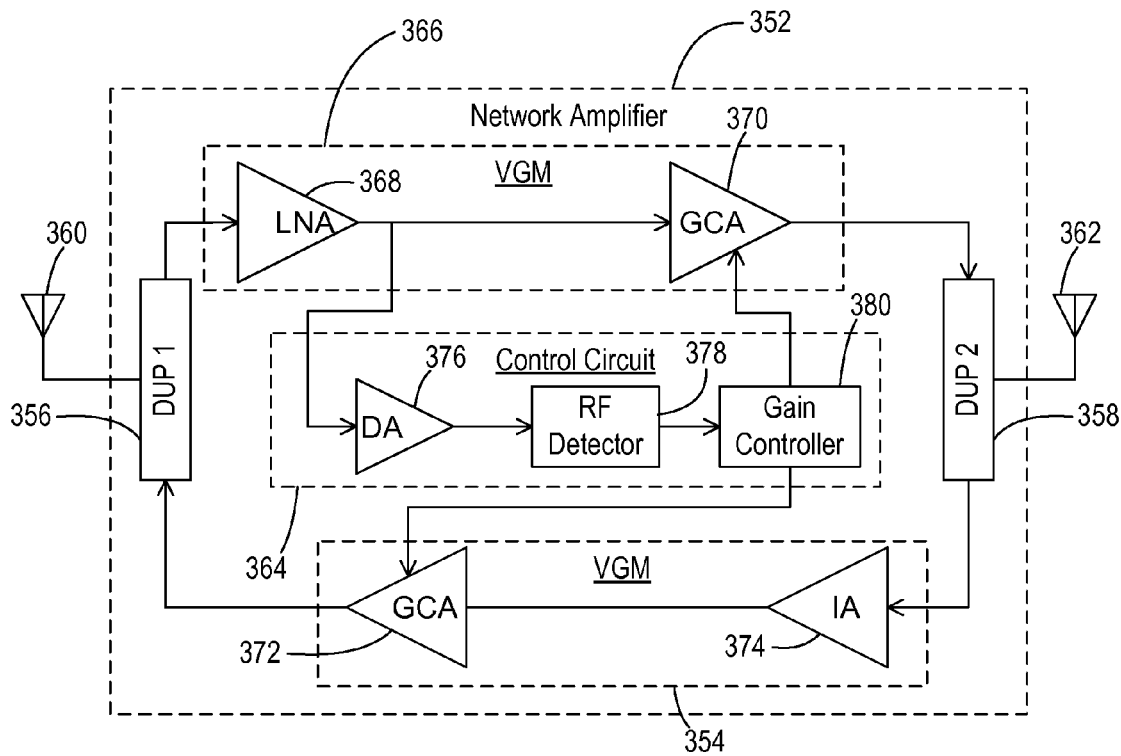

FIG. 3B illustrates another embodiment of a network amplifier. Similar to the network amplifier illustrated in FIG. 3A, the network amplifier 352 includes an antenna 360, a first and second duplexer (DUP 1) 356 and (DUP 2) 358, respectively, a first and second variable gain module 354 and 366, (included within the dashed boxes), control circuitry 364 (indicated by the dashed box), and an antenna 362. More particularly, the variable gain module 366 includes a low noise amplifier (LNA) 368 and a gain controlled amplifier (GCA) 370. The gain module 354 contains an intermediate amplifier (IA) 374 and a gain controlled amplifier (GCA) 372. The gain controlled amplifiers 370 and 372 may be voltage controlled amplifiers, digitally controlled programmable gain amplifiers, and the like. The input of the control circuitry 364 is received from the output of the low noise amplifier 368 for providing an adequate signal to be used for determining the amplification factors.

The control circuitry 364 includes, in this example, a detector amplifier (DA) 376, an RF detector 378, and a gain controller 380. Detector amplifier 376 amplifies the input signal to a level sufficient for driving RF detector 378. The RF detector 378 produces an output which is indicative of the signal level produced by the output of the low noise amplifier 368. As described above, the control circuitry 364 may be configured to accomplish various objectives when determining the amplification factors to be applied to the variable gain modules 366 and 354.

For example, based on the output of the RF detector 378, the gain controller 380 may increase the amplification factors applied to gain controlled amplifier 370 or 372 to ensure that the resultant signals have sufficient power and amplitude to provide satisfactory results. Where the input signal received by the network amplifier 352 by means of antenna 360 is sufficiently weak, the gain controller 380 typically sets the amplification factors to a maximum available value.

Furthermore, the gain controller 380 may decrease the amplification factors where it is determined that the signal levels would otherwise overload the base station, or otherwise cause harmful interference to the cellular network. In one embodiment, when the output of the RF detector 378 exceeds a predetermined threshold, the gain controller 380 turns off the gain controlled amplifiers 372 and 370. In other words, the control circuit 364 switches the amplification factor to a zero value when the level of the cellular signal received from the base station exceeds a predetermined value, and switches the amplification factor to a non-zero value when the signal level falls below the predetermined value.

In another embodiment, the gain controller 380 does not simply switch the gain controlled amplifiers on or off, but instead adjusts the amplification relative to the level of the signal received from the base station. In other words, the control circuit 364 sets the value of the amplification factors as a function of the level of the cellular signal received from the base station.

In one embodiment, the amplification factors applied to the gain controlled amplifiers 370 and 372 are equivalent. However, in another embodiment, the amplification factors applied to the gain controlled amplifiers 370 and 372 need not be the same. Although the gain controller 380 may only receive a single input signal, the gain controller may be configured to have two independent output signals to account for the unique requirements of the gain controlled amplifiers 370 and 372. In another embodiment, the changes made to the first and second amplification factors occur in identical incremental amounts. Therefore, even where the values of the amplification factors may not be identical, the changes made to the first amplification factor may match the changes made to the second amplification factor.

Figure 4A:
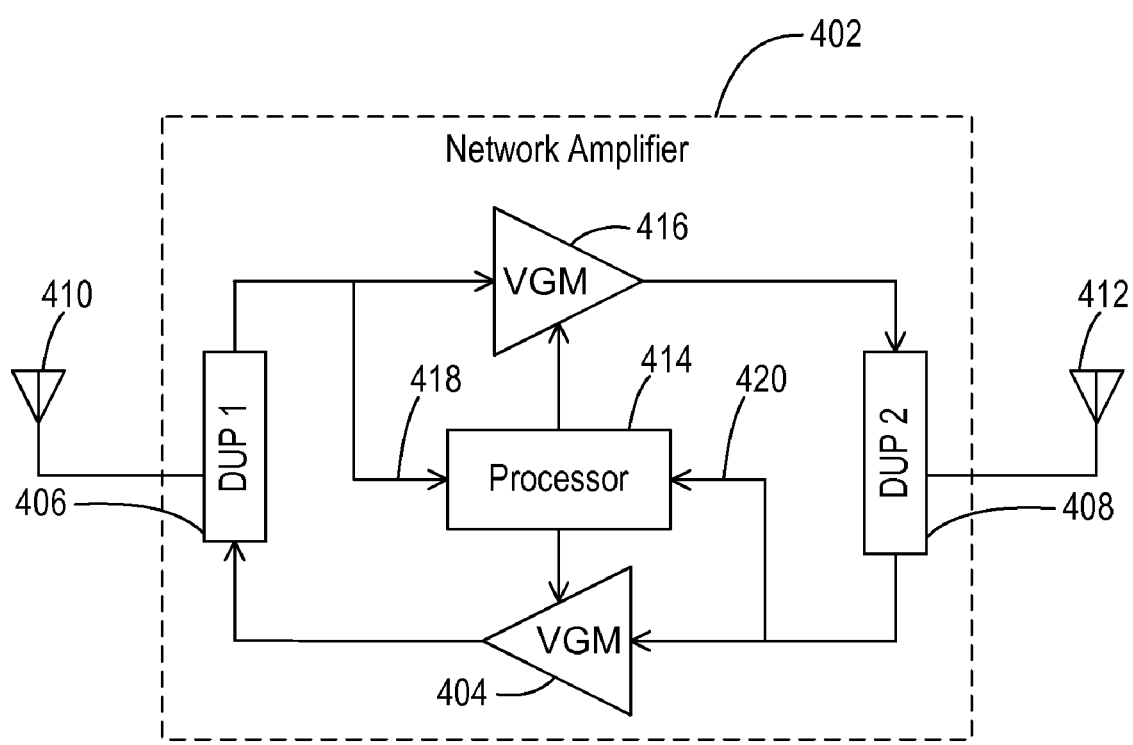

FIG. 4A illustrates another embodiment of a network amplifier 402 configured to generate optimum gain levels for the transmission of signals including radio or cellular type signals. The embodiment illustrated in FIG. 4A includes first and second antennas 410 and 412, respectively, first and second duplexers (DUP 1) 406 and (DUP 2) 408, respectively, first and second variable gain modules (VGM) 404 and 416, respectively, and processor 414. The antenna 412 is configured for transmitting cellular signals to at least one handset, and for receiving cellular signals from the same. The processor 414 may include analog circuits, digital circuits, a microprocessor, a programmable logic unit, an ASIC, an FPGA, and the like.

The processor 414 controls the amplification factors applied to the variable gain modules 404 and 416. Similar to the control circuitry 314 of the embodiment illustrated in FIG. 3A, the processor 414 may be configured to ensure that sufficient gain is applied to the cellular signals to ensure that the signals reach their target destination, and further ensure that the power level at which the signals are sent does not overload the base station.

Therefore, similar to the embodiment of FIG. 3B, the processor 414 may determine the maximum amplitude or power level that can be transmitted by antennas 410 and 412 to substantially eliminate interference. As described above, interference is considered to be substantially eliminated when signals are transmitted from the network amplifier 402 without causing harmful effects to the surrounding cellular network. For example, interference is substantially eliminated where the signals are transmitted without overpowering the base station, or otherwise interfering with the base station or with other handsets within the cellular network in a way that degrades their performance.

The processor 414 may further be configured to minimize the amplification of noise that may accompany a cellular signal. Unwanted noise may include noise introduced from the surrounding environment, thermal noise, and the like. Noise can be problematic, for example, if a network amplifier is located in close proximity to a base station but still applies a large amount of gain to the cellular signal. In some cases, if noise is significantly amplified, the noise level often exceeds the level of the cellular signal. The processor 414 may establish the amplification factors applied to variable gain modules 404 and 416 to either attenuate or amplify the electrical signals in order to reduce the level of amplified noise in the cellular signal and preclude overloading the base station.

The determination of the amplification factor values may be dependent on whether the signals received from the base station via antennas 410 or 412 exceed a threshold value. The threshold value may be a predetermined set value, or may be a variable that is not established until the processor 414 makes a determination based on the properties of the received signals. For example, if after analyzing the signals received via antenna 410 and/or 412, the processor 414 determines that the signal attenuation between cellular network amplifier 402 and the target base station or handset is substantial, the processor 414 may establish higher threshold values than if the base station signal was less attenuated. The higher threshold values would allow a greater amplification factor to be applied to the signals so that the transmitted signals will reach their target destination. After being amplified by the amplification factors determined by the processor 414 and transmitted from the antennas 410 and 412, the signals have sufficient power to arrive at the target destination (e.g., a base station or a handset), but are not amplified to such an extent that the base station will be overpowered or as to cause substantial interference with signals transmitted to or from other handsets.

The amplification factors applied to variable gain modules 404 and/or 416 may be calculated using the characteristics of the signals received from the handsets, as well as from the base station. In this example, the processor 414 receives input signals from the antenna 410 and the antenna 412 (i.e., connections 418 and 420, respectively). By monitoring the characteristics of the signals received from the handset and from the signals received from the base station, the processor 414 can make more accurate determinations regarding the level at which signals should be transmitted to the base station and to the handsets.

In addition to accomplishing the above objectives, the processor 414 may further be configured to substantially eliminate oscillation that may be generated by the network amplifier 402. When multiple antennas (e.g., antennas 410 and 412) are employed, embodiments of the invention ensure that the network amplifier 402 does not begin to oscillate. If the antennas 410 and 412 are too close to each other, an oscillation may result, which will likely cause harmful interference to a base station and/or the handsets connected to it and preclude effective communications. Oscillation in the network amplifier 402 is typically caused by feedback that may occur between the two antennas 410 and 412. If the gains produced by variable gain modules 404 and 416 are sufficiently low, the network amplifier 402 will remain stable. However, when the gains are high and/or if the antennas are physically too close to each other, the system will likely become unstable, and begin to oscillate.

The introduction of oscillation by an amplifier into a cellular network can be a serious problem. Network amplifiers are often installed by an end user instead of by a wireless service provider. Consequently, the wireless service provider cannot easily predict or mitigate the interference introduced by oscillation. The oscillating signals produced by the network amplifier 402 can extend beyond the intended target (i.e., the base station or handset) and intermingle with other signals. As a result, an oscillating signal from one cellular network amplifier can disrupt the communication links between a base station and the handsets within range of the oscillating amplifier. Since such oscillating signals are not on controlled frequencies, they may even interfere with other users of the electromagnetic spectrum.

For example, a common use for the network amplifier 402 is to amplify cellular signals being transmitted to and from a building. In an in-building scenario, the network amplifier 402 may be configured such that the antenna 412 is located within the interior of the building, and the antenna 410 is located on the exterior of the building. Cellular signals transmitted from a base station are received at the external antenna 410, amplified by variable gain module 416 in accordance with the amplification established by processor 414, and retransmitted by the internal antenna 412. Because the signals received from the base station are on the same frequency as the signals transmitted by the antenna 412, a potential for feedback exists, thus increasing the likelihood of an oscillating circuit. This likelihood is particularly high where the antennas 410 and 412 are located within close proximity to one another, and where the amplification of the variable gain modules 404 and 416 are set at a high level.

Therefore, the processor 414 may be configured to prevent the occurrence of oscillation within the network amplifier 402. The processor 414 achieves this objective by analyzing the signal levels of the inputs 418 and 420. When an oscillating condition exists, the levels of the signals received via the antennas 410 and 412 are typically significantly higher than when the network amplifier 402 is operating normally.

When the processor 414 detects conditions that may indicate oscillation, the processor 414 will eliminate the oscillating condition. The processor 414 may turn off the entire network amplifier 402 so that the handsets communicate directly to the base station instead of through the amplifier 402. Alternatively, the processor 414 may first attempt to only turn off the variable gain modules 404 or 416.

In an alternative embodiment, the processor 414 may decrement the amplification of the variable gain modules 404 or 416 until the oscillation ceases. By decrementing the amplification factors instead of immediately shutting off the network amplifier, the oscillation can be eliminated while still maintaining some level of gain. This process can be applied to the variable gain modules 404 and 416, simultaneously together, one at a time, or any other manner.

The network amplifier 402 may include a visual display for indicating the existence of an oscillating condition. For example, the visual display may include a light emitting diode (LED), or the like. The display may indicate that an oscillation has occurred in the past (but has since been eliminated by either shutting down the amplifier 402 or by reducing the gain of the variable gain modules 404 and/or 416) and may indicate the presence of an existing oscillation. After a user is aware of an oscillating condition, the user may reposition the antennas 410 and/or 412 so that the amplifier 402 may produce a larger gain without the introduction of oscillation.

Figure 4B:
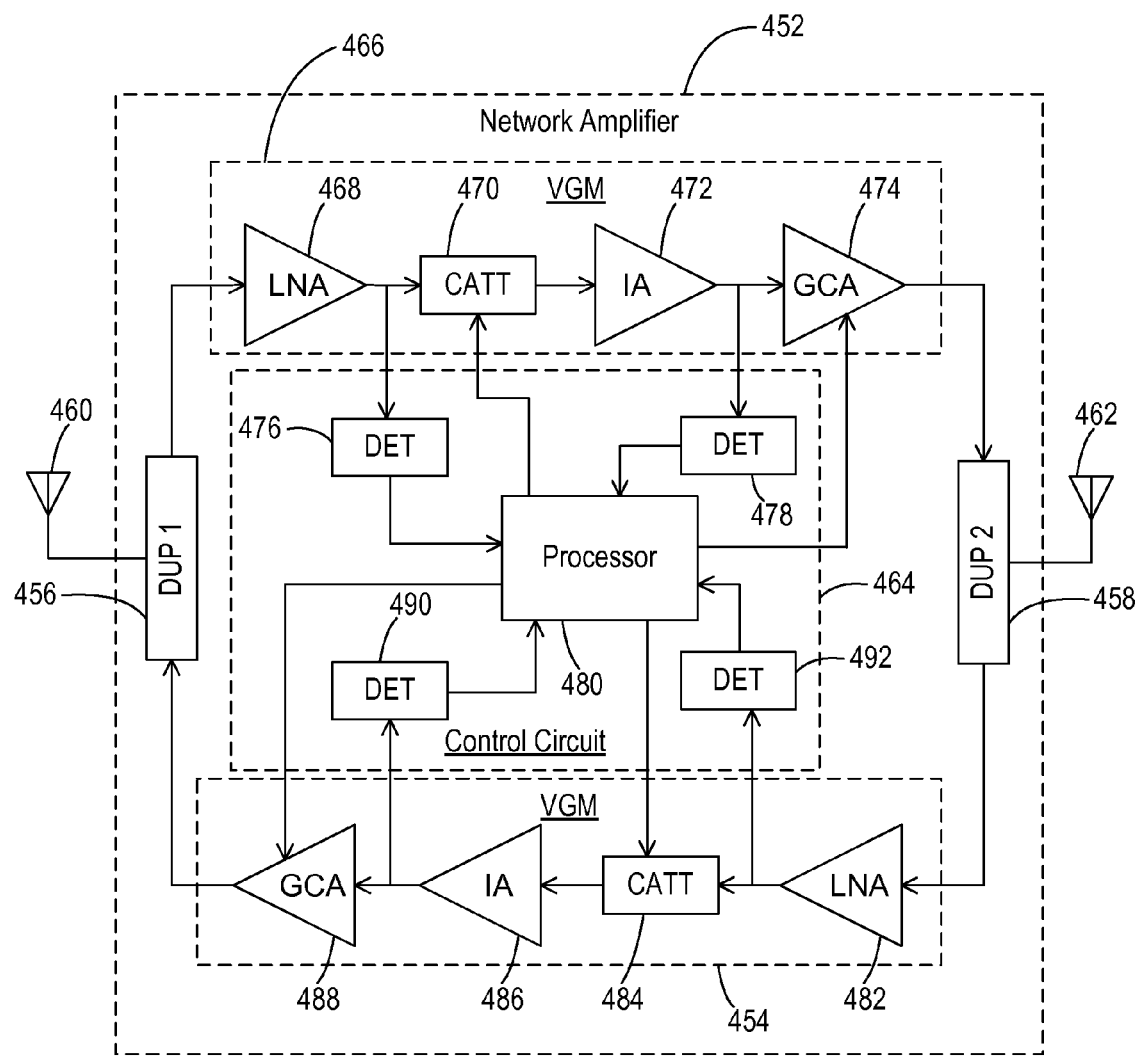

FIG. 4B illustrates another embodiment of a network amplifier. Similar to FIG. 4A, the network amplifier 452 includes first and second antennas 460 and 462, respectively, first and second duplexers 456 and 458, respectively, first and second variable gain modules, indicated by dashed boxes 466 and 454, respectively, and control circuitry, indicated by dashed box 464.

The first and second variable gain modules 454 and 466 may include low noise amplifiers (LNA) 468 and 482, controllable attenuators (CATT) 470 and 484, intermediate amplifiers (IA) 472 and 486, and gain controlled amplifiers (GCA) 474 and 488. The electrical signals generated by antennas 460 and 462 are initially amplified by the low noise amplifiers 468 and 482. The resultant signals may be attenuated by controllable attenuators 470 and 484. The amount of attenuation is dependant on first and second attenuation factors, as determined by the control circuitry 464. The resultant signal is amplified and buffered by intermediate amplifiers 472 and 486. The use of intermediate amplifiers 472 and 486 may vary depending on the gain levels required of the cellular network amplifier 452. The resultant signal is amplified by the gain controlled amplifiers 474 and 488 by an amount dependant on gain factors as determined by the control circuitry 464.

The control circuitry 464 includes, in this example, at least two detectors 478 and 490 that detect the signals at the output of the intermediate amplifiers 472 and 486. The results are provided to processor 480, which determines amplification factors for the variable gain modules 466 and 454. Each amplification factor includes a gain factor for the gain controlled amplifier 474 or 488, and an attenuation factor for the controllable attenuator 470 or 484. The processor 480 may increase or decrease the gain applied to the electrical signals while attempting to ensure that the transmitted signals reach their target destination (i.e., a handset or a base station). In the present embodiment, gain is increased by increasing the gain factor applied to the gain controlled amplifier 474 or 488. The processor 480 thus controls the gain applied to the gain controlled amplifier 474 or 488.

The processor 480 may further be configured to reduce or substantially eliminate interference that may be caused, by way of example, from overloading the base station, overamplification of thermal noise, and the like. As described above, when the amplifier 452 emits signals at excessive power levels, the base station may be overloaded, causing interference with the overall cellular network. Therefore, the processor 480 monitors the signal levels as provided by detector 478 or 490 to determine whether the signal levels exceed a threshold value. When the threshold is exceeded, the processor 480 may reduce the overall gain by either increasing the attenuation factor applied to the controllable attenuator 470 or 484, or by decreasing the gain factor applied to the gain controlled amplifier 474 or 488.

The processor 480 may similarly be configured to reduce or eliminate interference that may be caused from oscillation. When the detector 478 or 490 provides readings that indicate an oscillating condition, the processor 480 may incrementally change the attenuation factors applied to the controllable attenuators 470 and 484 and/or the gain factors applied to the gain controlled amplifier 474 or 488 in order to reduce the overall gain produced by the variable gain module 466 or 454. The attenuation factor may be incrementally increased, and the gain factor may be incrementally decreased. After each incremental change in the attenuation and/or gain factors, processor 480 analyzes the signal levels to determine if the oscillating condition still exists. If the amplifier 452 is still oscillating, the processor 480 increments the gain and/or attenuation factors again, and repeats the process until the oscillation has been eliminated, or at least reduced to an acceptable level.

In one embodiment of the present invention, additional detectors 476 and 492 are provided for the purpose of quickly eliminating any oscillation that may be generated by the network amplifier 452. While detectors 478 and 490 can be used to eliminate or reduce any oscillation by incrementally changing the gain and attenuation factors, as described in the previous embodiment, this mechanism may be too slow to preclude interference. Unfortunately, significant disruption can be caused to a cellular network within a much shorter period of time when an amplifier is oscillating. Therefore, detectors 476 and 492 are employed to provide a safety mechanism that can immediately eliminate oscillation when the oscillation exceeds a predetermined level. The detectors 476 and 492 provide the processor 480 with a reading of the signal level at the output of the low noise amplifier 468 or 482. If this reading exceeds a predetermined level, the processor 480 immediately shuts down all elements of the network amplifier 452 that are causing the oscillation to occur. The user is notified of the oscillation condition, and the user may reposition the antennas 460 and 462 in an attempt to eliminate the condition creating the oscillation. In this manner, disruption due to high levels of oscillation is prevented.

Figure 5:
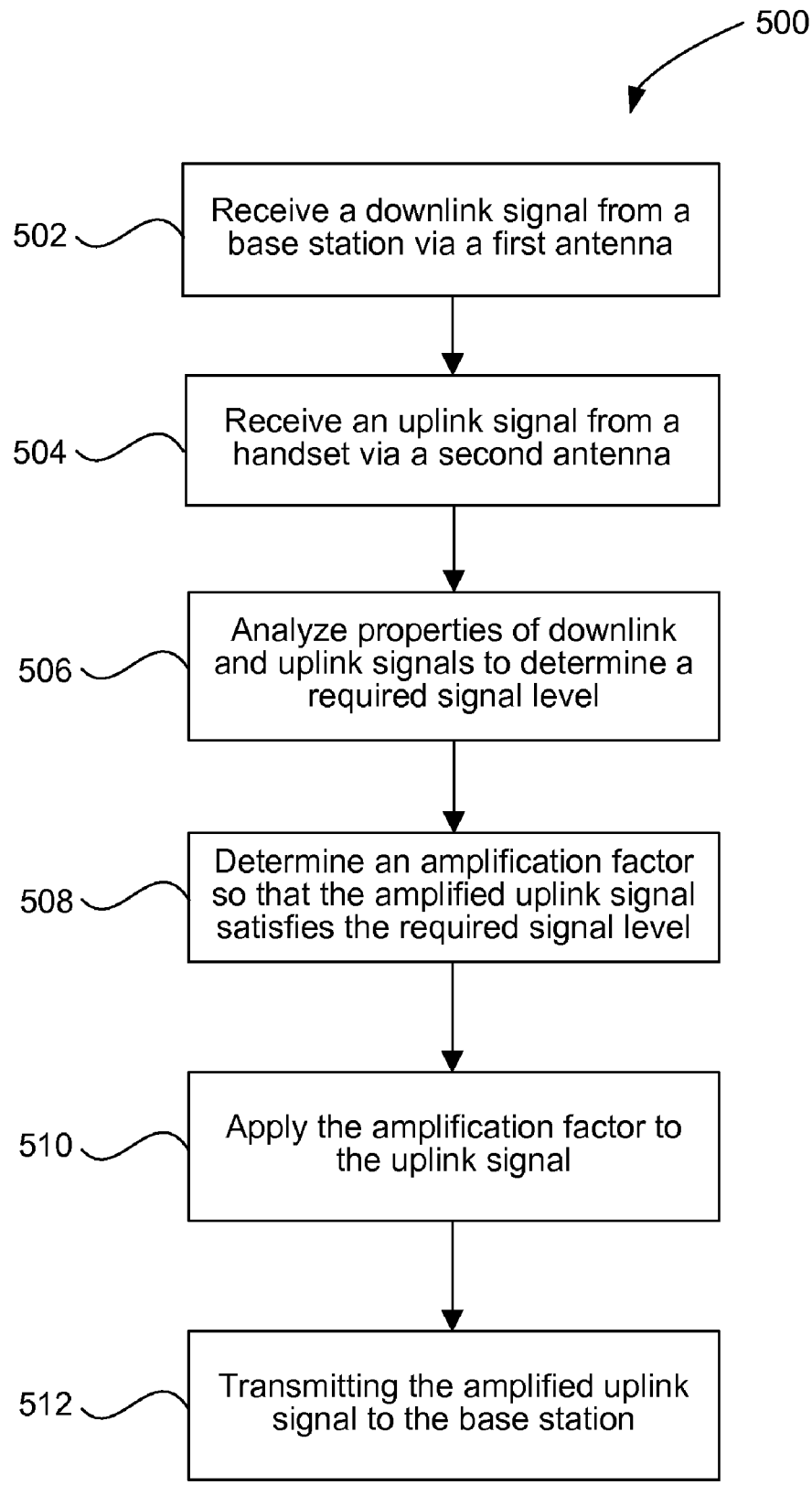
FIG. 5 is a flow diagram of an exemplary method for amplifying cellular signals using a network amplifier.

FIG. 5 illustrates a flow diagram for an exemplary embodiment of the present invention. The following description of FIG. 5 may occasionally refer to FIGS. 1-4B. Although reference may be made to a specific element from these figures, such elements are used for illustrative purposes only and are not meant to limit or otherwise narrow the scope of the present invention unless explicitly claimed.

FIG. 5 illustrates a flow diagram for a method 500 of variably amplifying a cellular signal. Method 500 includes receiving 502 a downlink signal from a base station via a first antenna, and receiving 504 an uplink signal from a handset via a second antenna. As shown in FIGS. 4A and 4B, the uplink signal may be received from antenna 410 or 460, and the downlink signal may be received from antenna 412 or 462.

The properties the downlink and/or uplink signals are analyzed 506 to determine a required signal level at which a signal should be transmitted by a network amplifier in order for the signal to reach the base station. In the exemplary embodiments of FIGS. 4A and 4B, a processor 414 or 464 performs the analysis of the cellular signals and the adjustment of the amplification factor.

An amplification factor is then determined 508 such that when the amplification factor is applied to the uplink signal, the level of the resultant amplified uplink signal satisfies the required signal level, as determined at 506. In one embodiment, the step of determining 508 the amplification factor further comprises selecting the amplification factor so that interference introduced into the surrounding cellular network by the transmission of the adjusted uplink signal is substantially eliminated. For example, the signal level of the downlink and/or uplink signals may be measured and compared to one or more predetermined values. If one or both of the signal levels exceeds the predetermined values, the amplification factor may be reduced in order to prevent the introduction of interference into the cellular network. Furthermore, the amplification factor may include a first and second amplification factor, the first amplification factor being applied to the uplink signal, and the second amplification factor being applied to the downlink signal. The second amplification factor may also be selected so that interference introduced into the surrounding cellular network by the transmission of the adjusted uplink signal is substantially eliminated.

The adjusted amplification factor is then applied 510 to the uplink signal to generate the amplified uplink signal. Finally, the amplified uplink signal is transmitted 512 to the base station via the first antenna.

Figure 6:
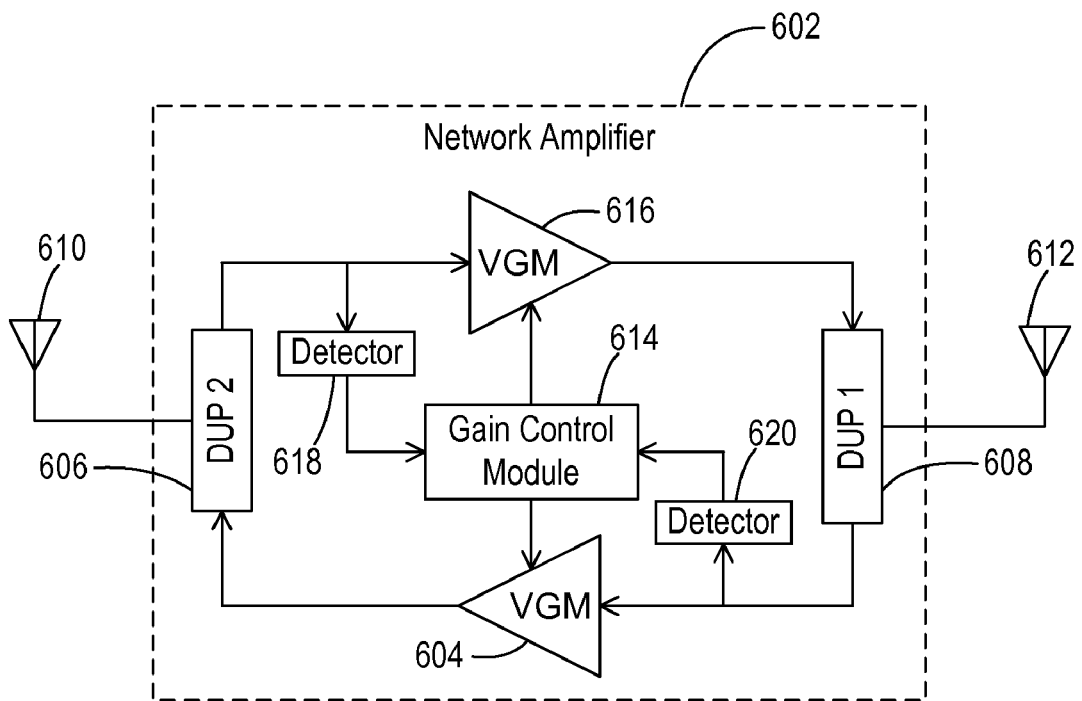
FIG. 6 illustrates a schematic diagram of a cellular network amplifier using a variable gain module to limit the power output of the amplifier.

FIG. 6 illustrates another embodiment of a network amplifier 602 that is designed to maintain the power output levels of the network amplifier below predetermined levels. In many of the above embodiments, the variable gain modules are controlled by a controller or processor in order to achieve a desired result. For example, in FIGS. 2 and 3, the controllers are designed to control the power output of the network amplifiers in order to reduce or eliminate network interference introduced by the signals transmitted from the network amplifiers. In FIGS. 4A and 4B, the processors are designed to control the power output of the network amplifiers so as to reduce or eliminate oscillating conditions that may be caused by excess power levels generated by the network amplifiers. In certain situations, it may be desirable to maintain the power levels of the signals transmitted from the network amplifier below a desired level. For example, it may be the case that a power level above a predetermined level is highly likely to introduce interference into the surrounding network. Alternatively, power levels above a certain level may saturate one or more of the amplifiers being used, thereby introducing unwanted noise into the signal. Furthermore, regulatory agencies often place upper limits on the cellular signal power levels that can be transmitted from a device. Therefore, it may be desirable to limit the power output levels, even where high output levels may otherwise be desired due to the likelihood of signal attenuation.

Therefore, in the current embodiment, a gain control module 614 is provided in order to ensure that the signals transmitted from the network amplifier 602 are maintained below a predetermined level. The network amplifier 602 may also include an antenna 612, a first duplexer 608, a detector 620, the first variable gain modules 604, a second duplexer 606, and a second antenna 610. The detector 620 measures the level of an uplink signal received by the antenna 612. The gain control module 614 determines whether the current amplification factor being applied to the uplink signal by the variable gain modules 604 will produce an amplified signal that exceeds a predetermined level. If the amplified uplink signal exceeds the predetermined level, the gain control module 614 may adjust the amplification factor applied by the variable gain module 604 such that the amplified uplink signal will not exceed the predetermined level. In the present embodiment, the maximum allowable power output may not be exceeded regardless of how much attenuation the signals may undergo in route to their target destinations (i.e., the handset or the base station).

In one embodiment, the gain control module 614 and the detector 620 may be combined into a single device capable of performing the tasks of detecting the uplink signal level and of controlling the variable gain module 604. In another embodiment, the detector 620 may measure the output level of the variable gain modules 604 instead of the input level to the variable gain module 616, such that the detector 620 detects the level of the amplified uplink signal. In this embodiment, the gain control module can perform a direct comparison of the amplified uplink signal level to the predetermined level to determine if the amplification factor applied by the variable gain modules 604 should be reduced.

In one embodiment, the network amplifier 602 further includes a second detector 618 and a second variable gain module 616. The detector 618 measures the level of the downlink signal received from a base station by the antenna 610, similar to the above description of the detector 620. The gain control module 614 may adjust the gain applied by the variable gain module 616 such that the amplified downlink signal produced by the variable gain module 616 remains below a predetermined level.

In one embodiment, the limits established for the output power of the variable gain modules 604 and 616 may be the same, i.e., the gain control module 614 insures that the amplified uplink signal produced by the variable gain module 604 and the amplified downlink signal produced by the variable gain module 616 remain below the same maximum power limit level. In an alternative embodiment, the maximum power limit for the amplified uplink signal may differ from the maximum power limit level for the amplified downlink signal.

In one embodiment, the gain control module 614 causes both of the variable gain modules 604 and 616 to apply the same amplification factors to both the uplink signal and to the downlink signal, respectively. In another embodiment, the gain control module 614 may control the gain levels of the variable gain modules 604 and 616 independently from one another. By independently controlling the gain levels, the gain control module 614 can account for various unique situations that may arise.

For example, two people may be using handsets that are each transmitting signals that are being amplified by the network amplifier 602. One of the handsets may be in close proximity (e.g., 5 ft.) to the antenna 612, while the other handset may be a substantial distance (e.g., 50 ft.) from the antenna 612. When the antenna 612 receives each of the signals, the signal transmitted from the handset that is a far away from the antenna is likely more attenuated than the signal transmitted from the handset that is close to the antenna.

However, when the detector 620 measures the signal level of the uplink signal, a relatively strong signal level is detected due to the close proximity of one of the handsets. Therefore, the gain control module 614 may instruct the variable gain modules 604 to apply a relatively low amplification factor to the uplink signal. If the gain control module 614 were to apply the same amplification factors to both variable gain modules 604 and 616, the variable gain module 616 amplifying the downlink signal from the base station would also apply a low amplification factor to the downlink signal. Therefore, the handset that is a substantial distance from the antenna 612 will likely receive a weak signal and have poor reception. However, by controlling the amplification factors of the variable gain modules 604 and 616 independently, in accordance with the present embodiment, the amplification factor applied by the downlink variable gain module 616 can be maintained at a higher level than the amplification factor applied by the uplink variable gain module 604 so that the handset that is far away from the antenna 612 will receive a sufficiently strong signal.

Therefore, in general, one embodiment of the invention allows the second amplification factor to exceed the first amplification factor, such that the downlink signal is amplified more than the uplink signal. In another embodiment, the second predetermined limit is established at a higher level than the first predetermined limit, such that the amplified downlink signal is allowed to reach a greater overall power output than the amplified uplink signal.

Figure 7:
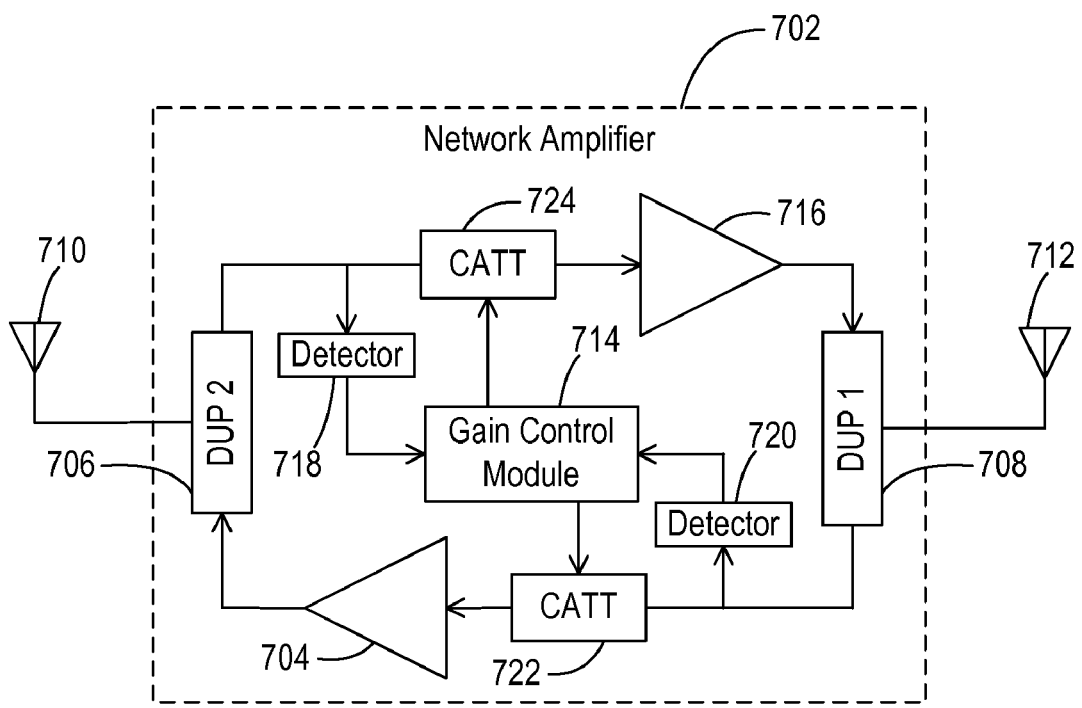
FIG. 7 illustrates a schematic diagram of a cellular network amplifier using a multistage attenuator to limit the power output of the amplifier.

FIG. 7 illustrates an alternative embodiment for limiting the power output of the network amplifier 702. Multistage controllable attenuators 722 and 724 are provided for attenuating the uplink and/or downlink signals when the signal levels detected by the detectors 718 and/or 720 exceed a predetermined level. The amplifiers 704 and 716 may apply a fixed gain level to the uplink and downlink signals, respectively. As the signal levels increase, the attenuators 722 and 724 progressively activate stages of attenuation in order to maintain the amplified signals below predetermined limits.

The gain control module 714 receives a signal level from the detectors 718 and 720. The gain control module 714 determines if the output of the amplifiers 704 and 716 will exceed the predetermined power limits of the network amplifier 702. If the power limits will be exceeded based on the existing amplification levels, the gain control module 714 activates an appropriate attenuation necessary to maintain the amplified signals below the predetermined limits.

Although the embodiments illustrated in FIGS. 6 and 7 provide variable gain modules to limit the output power of both the uplink signals and the downlink signals, in one embodiment the power is only limited on either the uplink signal path or the downlink signal path. In such a case, the uplink or the downlink signal may be limited as described above, and the other signal may be amplified by a constant gain, or by using any of the other techniques described herein, as well as other techniques.

Figure 8A:
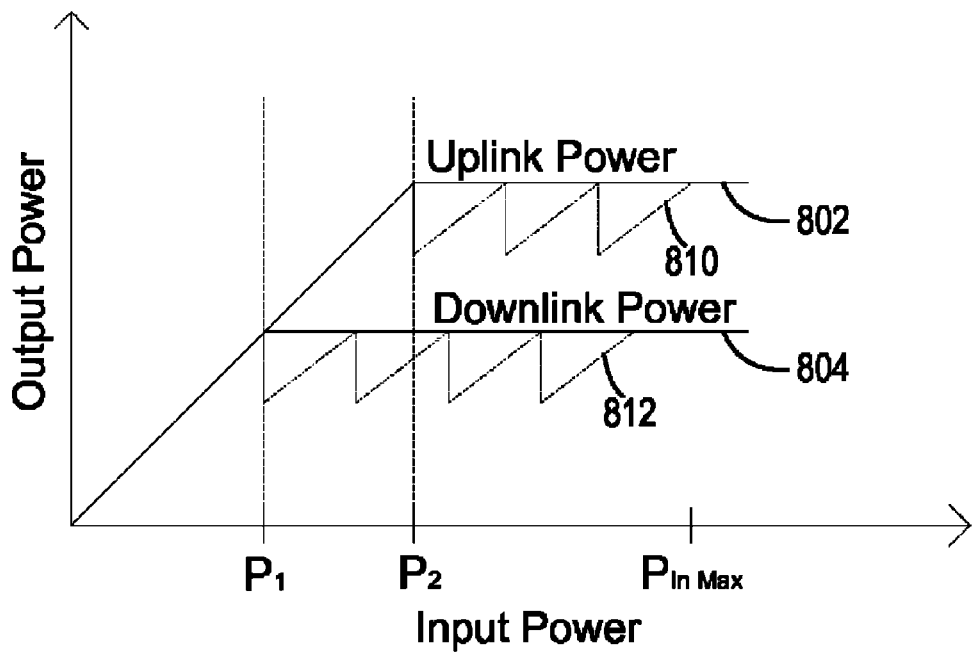
FIGS. 8A and 8B illustrate plots of the power output of example amplifiers that may be used in the present invention.
Figure 8B:
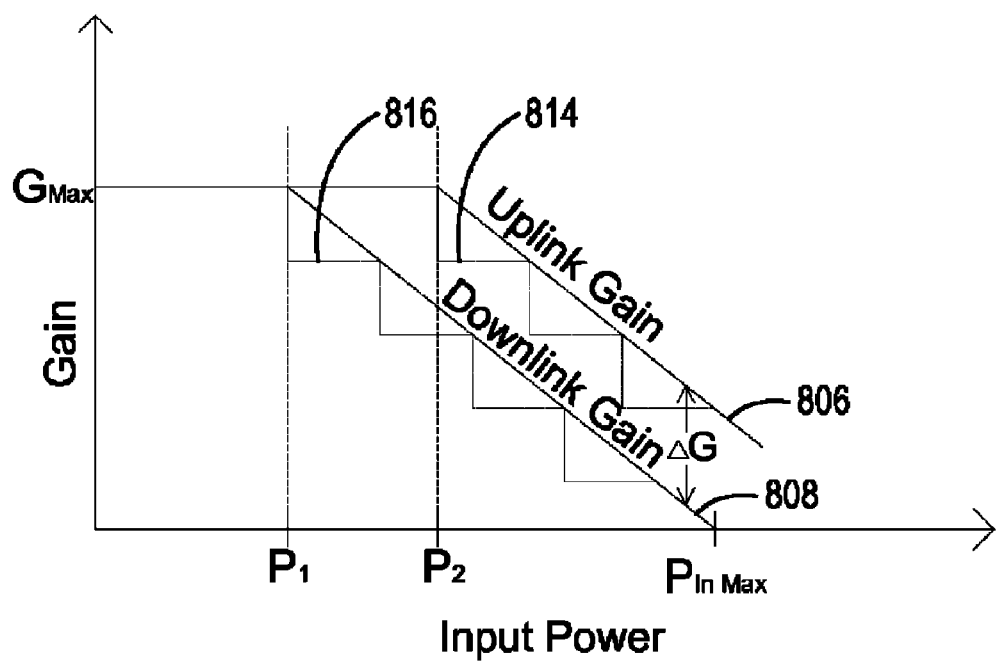

FIGS. 8A and 8B illustrate response plots for an example amplifier that may be employed for applying an upper power limit on the amplified uplink and downlink signals, and which may be controlled by a gain control module described previously. FIG. 8A illustrates the maximum output power (Y-axis) of the network amplifier for a given input power (X-axis) and FIG. 8B illustrates the maximum gain of the amplifier (Y-axis) for a given input power (X-axis).

As illustrated in FIG. 8A, the maximum output power of the example amplifier may increase linearly until it reaches a maximum predetermined limit as established by a gain control module. In the present example, the maximum predetermined power output limits correspond to input power levels "$P_1$" and "$P_2$." As shown in FIG. 8B, until reaching the maximum allowable output power (at input power "$P_1$" and "$P_2$"), a constant level of maximum gain may be applied by the amplifiers. Referring again to FIG. 8A, the maximum predetermined limit of the uplink signal may exceed the maximum predetermined limit of the downlink signal. As shown in FIG. 8B, upon reaching the maximum allowable power (at input power "$P_1$" and "$P_2$"), the gain control module may begin to reduce the maximum gain applied to the signals, thereby maintaining the output power below the predetermined limits.

As illustrated by the solid lines 802, 804, 806 and 808 in FIGS. 8A and 8B, the gain control module may reduce the gain levels applied to the uplink and downlink signals at a gradual rate, thereby allowing the output power to achieve the maximum allowable limit for any given input power. Alternatively, the dashed lines 810, 812, 814 and 816 describe the power output and perceived gain of the amplifiers in FIG. 7, where multistage attenuators are used for reducing the gain of the amplifier. As the input power increases, the gain control module progressively activates additional stages of attenuation in order to maintain the output power below the prescribed limits. Each level of attenuation relates to an immediate reduction in the gain (FIG. 8B) as well as an immediate reduction in output power (FIG. 8A).

As described previously, the maximum allowable output power for the uplink and downlink signals may differ. Furthermore, the gains applied to the uplink and downlink signals may differ. For example, referring again to FIG. 8B, upon reaching the input power $P_1$, a gain control module may begin to reduce the maximum allowable gain for the uplink signal, while allowing the downlink signal to remain at the original maximum gain level. This causes the output power of the uplink signal to reach and remain at a maximum level, as illustrated in FIG. 8A. Upon reaching the input power $P_2$, the gain control module may begin to reduce the maximum allowable gain for the downlink signal, as illustrated in FIG. 8B. This causes the output power of the downlink signal to reach and remain at its maximum level, as illustrated in FIG. 8A.

In the FIG. 8B example, the uplink gain exceeds the downlink gain at input powers above $P_1$. However, in other embodiments, the downlink gain may be allowed to exceed the uplink gain.

Figure 9:
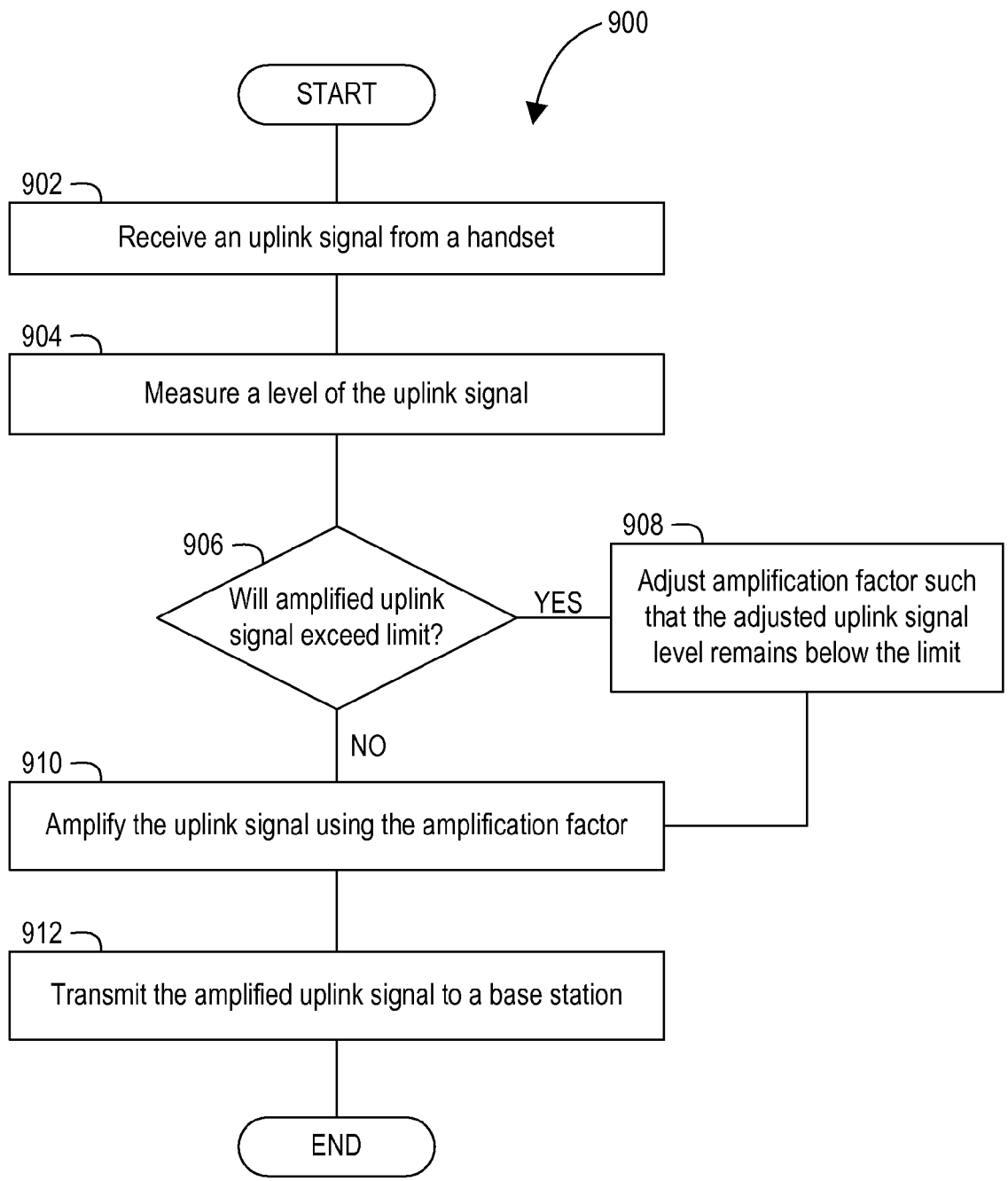
FIG. 9 is a flow diagram of an exemplary method for variably amplifying a cellular signal.

FIG. 9 illustrates one embodiment of a method 900 of variably amplifying a cellular signal. The method 900 may be practiced, for example, in a network amplifier. The network amplifier may include one or more computer-readable media having computer-executable instructions, that when executed, implement the method 900. The method 900 receives 902 an uplink signal from a handset, for example, via a first antenna. The level of the uplink signal is measured 904, for example, using a detector 620, as illustrated in FIG. 6. The level of the uplink signal may be measured either before or after the uplink signal is amplified, for example by a variable gain module 604.

The method 900 then determines 906 whether the level of an amplified uplink signal will exceed a predetermined limit. If the predetermined limit is exceeded by the amplified uplink signal, the method 900 further includes adjusting 908 the amplification factor to be applied to the uplink signal such that the amplified uplink signal level remains below the predetermined limit. In one embodiment, the amplification factor is adjusted by progressively activating stages of attenuation as the level of the uplink signal increases in order to maintain the level of the amplified uplink signal below the predetermined limit.

The resultant amplification factor is then used to amplify 910 the uplink signal, and the amplified signal is transmitted 912 to a base station via a second antenna.

A similar method may also be performed on the downlink signal in order to maintain an amplified downlink signal below another predetermined limit. For example, after receiving a downlink signal from the base station via the second antenna, the level of the downlink signal is measured. A determination is made as to whether an amplified downlink signal will exceed the predetermined limit for the downlink signal. If the predetermined limit will be exceeded, the second amplification factor is adjusted such that the amplified downlink signal level remains below the predetermined limit. The downlink signal is amplified using the resultant amplification factor, and the adjusted downlink signal is transmitted to the handset via the first antenna.

In one embodiment, the amplification factors applied to the uplink and downlink signals are controlled independently from one another. For example, the amplification factor applied to the downlink signal may be allowed to exceed the amplification factor applied to the uplink signal. Similarly, the predetermined power limit of the amplified downlink signal may be established at a higher level than the predetermined power limit of the uplink signal.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network amplifier, comprising:
   a first variable gain module having an input configured to receive an uplink signal from a handset and configured to apply a first amplification factor to the uplink signal to generate an adjusted uplink signal to be transmitted to a base station;
   a first detector configured to detect a level of the uplink signal;
   a gain control module configured to control the first amplification factor of the first variable gain module for limiting the output of the first variable gain module to ensure that the level of the adjusted uplink signal does not exceed a first predetermined limit;
   a first antenna configured to receive a downlink signal from the base station, the first antenna being coupled to an output of the first variable gain module and configured to transmit the adjusted uplink signal to a base station; and
   a second gain module having an input coupled to the first antenna, the second gain module configured to apply a second amplification factor to the downlink signal, thereby generating an adjusted downlink signal to be communicated to the handset;
   a second detector for detecting a level of the downlink signal,
   wherein the second gain module is a second variable gain module and is coupled to the gain control module, the gain control module further configured to ensure that the level of the adjusted downlink signal does not exceed a second predetermined limit,
   wherein the first and second amplification factors are controlled independently from one another by the gain control module, and
   wherein the first amplification factor is allowed to exceed the second amplification factor, and the first predetermined limit is established at a higher level than the second predetermined limit.

2. The network amplifier as recited in claim 1, wherein the uplink signal is received from the handset via a second antenna.

3. The network amplifier as recited in claim 1, wherein the gain controller reduces the first amplification factor in predetermined increments as the level of the uplink signal increases in order to maintain the level of the adjusted uplink signal below the first predetermined limit.

4. A network amplifier, comprising:
   a first antenna configured to receive an uplink signal from a handset;
   a first detector for detecting a level of the uplink signal;
   a first gain module configured to apply a first amplification factor to the uplink signal to generate an adjusted uplink signal, the first gain module comprising:
     a first amplifier configured to amplify the uplink signal; and
     a first multistage attenuator configured to attenuate the uplink signal by progressively activating stages of attenuation as the level of the uplink signal increases in order to maintain the adjusted uplink signal level below a first predetermined level, wherein the first amplification factor equals a combined effect of the first amplifier and the first multistage attenuator;
   a second antenna configured to receive a downlink signal from the base station, the first antenna being coupled to an output of the first gain module and configured to transmit the adjusted uplink signal to a base station;

a second gain module having an input coupled to the second antenna, the second gain module configured to apply a second amplification factor to the downlink signal, thereby generating an adjusted downlink signal to be communicated to the handset via the first antenna;

a second detector for detecting a level of the downlink signal; and a second multistage attenuator configured to attenuate the downlink signal by progressively activating stages of attenuation as the level of the downlink signal increases in order to maintain the adjusted downlink signal level below a second predetermined level, wherein the stages of attenuation of the first and second multistage attenuators are controlled independently from one another, and wherein the second amplification factor is allowed to exceed the first amplification factor, and the second predetermined level is established at a higher level than the first predetermined level.

5. The network amplifier as recited in claim 4, wherein a value of the first amplification factor is selected from a plurality of predefined amplification values.

6. The network amplifier as recited in claim 4, further comprising a gain control module configured to receive a signal level from the detector and control the stages of attenuation of the multistage attenuator.

7. In a network amplifier, one or more computer readable media having stored thereon computer executable instructions that, when executed by a processor, can cause the network amplifier to perform a method for variably amplifying a cellular signal, the method comprising:

receiving an uplink signal from a handset via a first antenna;

measuring a level of the uplink signal;

determining if amplifying the uplink signal using a first amplification factor generates an adjusted uplink signal having a level that exceeds a first predetermined limit;

adjusting the first amplification factor in when the adjusted uplink signal level exceeds the first predetermined limit such that the adjusted uplink signal level remains below the first predetermined limit;

amplifying the uplink signal using the resultant first amplification factor to generate the adjusted uplink signal;

transmitting the adjusted uplink signal to a base station via a second antenna;

receiving a downlink signal from the base station via the second antenna;

measuring a level of the downlink signal;

determining if amplifying the downlink using a second amplification factor generates an adjusted downlink signal having a level that exceeds a second predetermined limit;

adjusting the second amplification factor in the event that the adjusted downlink signal level exceeds the second predetermined limit such that the adjusted downlink signal level remains below the second predetermined limit;

amplifying the downlink signal using the resultant second amplification factor to generate the adjusted downlink signal; and transmitting the adjusted downlink signal to the handset via the first antenna, wherein the first and second amplification factors are controlled independently from each other, wherein the second amplification factor is allowed to exceed the first amplification factor, and wherein the second predetermined limit is established at a higher level than the first predetermined limit.

8. The network amplifier as recited in claim 7, wherein adjusting the first amplification factor when the adjusted uplink signal level exceeds the first predetermined limit such that the adjusted uplink signal level remains below the first predetermined limit further comprises progressively activating stages of attenuation as the level of the uplink signal increases.

9. The network amplifier as recited in claim 7, wherein measuring a level of the uplink signal further comprises measuring the level of the adjusted uplink signal to determine if it exceeds the first predetermined limit.

* * * * *